United States Patent
Qutub et al.

[11] Patent Number: 5,926,391
[45] Date of Patent: *Jul. 20, 1999

[54] ADAPTIVE INSERTER STOPPER SYSTEM AND METHOD OF USE

[75] Inventors: Motaz Qutub, Rancho Cordova; Steven L. Mulkey, Cameron Park; Marc J. Fagan, Davis, all of Calif.

[73] Assignee: International Billing Services, Inc., Rancho Cordova, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/711,722

[22] Filed: Sep. 4, 1996

[51] Int. Cl.$^6$ ...................................................... G06F 19/00
[52] U.S. Cl. ............................... 364/478.08; 364/478.01; 53/52; 705/406; 705/410
[58] Field of Search .............................. 364/559, 464.11, 364/478.01, 478.08, 478.12, 478.14, 528.39, 148.01, 478.07; 53/75, 52, 284.3; 705/406, 410

[56] References Cited

U.S. PATENT DOCUMENTS

| | | | |
|---|---|---|---|
| 5,510,997 | 4/1996 | Hines et al. | 364/478.08 |
| 5,555,701 | 9/1996 | Fehringer et al. | 53/75 |
| 5,596,861 | 1/1997 | Preston et al. | 53/52 |
| 5,659,481 | 8/1997 | Qutub et al. | 364/478.08 |

*Primary Examiner*—John Barlow
*Assistant Examiner*—Hien Vo
*Attorney, Agent, or Firm*—James M. Ritchey

[57] ABSTRACT

For use with an envelope inserting apparatus having a motor and timing shaft or other suitable rotating member, a system and method for producing an actual stopping rotational position for the timing shaft or other suitable rotating member that corresponds to a desired or strategic stopping rotational position for the timing shaft or other suitable rotating member has a shaft encoder for establishing a rotational position of the timing shaft or other suitable rotating member. Additionally, included is a controlling computer that is interfaced with the shaft encoder and initiates the stopping of the timing shaft or other suitable rotating member at a desired rotational position by applying a stop command at a rotational position determined by an iterative analysis based on a previous stopping point for the timing shaft or other suitable rotating member.

18 Claims, 4 Drawing Sheets

ADAPTIVE INSERTER STOPPER SYSTEM AND METHOD OF USE

BACKGROUND OF THE INVENTION

1. Field of the Invention

A system and method for stopping an envelope inserter at a desired or strategic and reproducible location or rotational position. More specifically, disclosed is an inserter stopping system that adapts via an iterative or feedback analysis and thereby issues a stop command that produces a halt of the envelope inserter at the desired or strategic stop rotational position. The iteration analysis utilizes a first stop command issued at a known rotational position to produce an actual stop rotational position and determines the difference between the actual stop rotational position and the desired or strategic stop rotational position. The first stop command rotational position is then altered by the difference between actual stop rotational position and the desired or strategic stop rotational position to produce a second stop command rotational position that when utilized generates an actual stop rotation position that corresponds closely to the desired or strategic stop rotational position for the inserter.

2. Description of the Background Art

Inserter devices are used to place items within a mailing envelope to produce a mailing piece. The items within a mailing envelope may be inserts of various kinds, a billing statement, a return envelope, and the like. An example of a typical inserter is one termed a "PHILLIPSBURG." In a typical inserter a central shaft drives and coordinates the operations of the machine. As the shaft turns, many operations are performed, including; mailing envelopes are readied for insertion, inserts are picked and collected for insertion, insertion of the inserts into the mailing envelope, transport of the filled mailing envelope to subsequent processing steps, and the like.

Typically, a cycle for the inserter machine consists of processing one mailing piece and requires the shaft to turn through a 360° rotation. For each mailing piece the inserter may be initially stopped or in motion from a previous mailing piece and once finished processing a particular mailing piece the inserter may stay in motion to handle further mailing pieces or stop. To stop the inserter a stop command is given and the shaft slows, usually with a braking means, to a stop. With the traditional inserter technology, depending on the rotational velocity of the shaft, the final stop rotational position varies. Problems in processing a mailing piece often arise when the stop position of the shaft is not reproducibly at a desired or strategic rotational position. If after one cycle the inserter stops at a rotational position that is 20° off from a true rotational position start point the subsequent cycle may not be processed properly and/or the inserter may jam causing annoying and costly delays. The subject device overcomes these problems by permitting the controlling computer to stop the inserter with the timing shaft or other suitable rotating member at a desired or strategic rotational position.

The foregoing information reflects the state of the art of which the applicant is aware and is tendered with the view toward discharging applicant's acknowledged duty of candor in disclosing information which may be pertinent in the examination of this application. It is respectfully submitted, however, that this information does not teach or render obvious, singly or when considered in combination, applicant's claimed invention.

SUMMARY OF THE INVENTION

An object of the present invention is to provide a system for halting an envelope inserter at a desired or strategic angular position on its timing shaft or other suitable rotating member.

Another object of the present invention is to supply a system that utilizes a shaft encoder to note rotational positions of the motor, drive shaft, timing shaft or other suitable rotating member of an envelope inserter and then directs the rotating member to stop at a desired or strategic rotational position.

A further object of the present invention is to disclose a system and method for stopping an envelope inserter at a desired or strategic rotational position of its associated rotating member by means of applying a stop command to the motor at a rotational position calculated to produce stopping at the desired or strategic rotational position.

Still another object of the present invention is to relate a computer controlled system and method for stopping an envelope inserter at a desired or strategic rotational position of its associated rotating member by means of applying a stop command at a rotational position calculated via an iterative analysis from a prior stopping cycle, thereby initiating a stop of the rotating member at the desired or strategic rotational position.

Yet a further object of the present invention is to furnish a method of stopping a rotating member of an envelope inserter at a desired or strategic rotational position via initiation of a stop command delivered by a controlling computer that determines when to issue the stop command by an iterative calculation based on a prior stop of the rotating member.

Yet still another object of the present invention is to provide a method of stopping a rotating member of an envelope inserter at a desired or strategic rotational position that is readily adaptive to the differences between each specific inserter upon which it is used.

Disclosed for use with an envelope inserting apparatus having rotating members that include a motor and coupled timing shaft or other suitable rotating member (the motor and timing shaft or other suitable rotating member are also linked to a central drive shaft that in the inserter) is a system for producing an actual stop rotational position for the rotating member that corresponds to a desired or strategic stop rotational position for the timing shaft or other suitable rotating member. Comprising the system is a shaft encoder linked to a rotating member of the inserter including the motor, drive shaft, timing shaft or other suitable rotating member, and other suitable components for establishing rotational positions of the rotating member. Interfaced with the encoder is a controller having programming that utilizes the established rotational positions of the rotating member for stopping the timing shaft or other suitable rotating member at the desired or strategic rotational position. The controller's programming comprises the steps of: registering a desired or strategic stop rotational position Z for the timing shaft or other suitable rotating member; issuing a stop command to the motor when the coupled timing shaft or other suitable rotating member is at a rotational position X, as determined by the shaft encoder; recording a rotational position Y at which the timing shaft or other suitable rotating member actually stops, as determined by the shaft encoder; calculating from the rotational positions X, Y, and Z a rotational position N with the equation $X-(Y-Z)=N$, wherein N is a rotational position at which the next stop command is issued by the programming; issuing the next stop command at the rotational position N; noting a rotational position F where the timing shaft or other suitable rotating member actually stops after the issuing of the next stop command at the rotational position N; and repeating the programming steps each time the timing shaft or other suitable rotating member is stopped.

In addition to the system outlined above, a method for stopping the timing shaft or other suitable rotating member at the desired or strategic rotational position is disclosed. Comprising the subject method are the steps of: utilizing a shaft encoder linked to the timing shaft or other suitable rotating member for establishing rotational positions of the timing shaft or other suitable rotating member; registering by the controlling computer a desired or strategic stop rotational position Z for the timing shaft or other suitable rotating member; issuing by the controlling computer a stop command to the motor when the coupled timing shaft or other suitable rotating member is at a rotational position X, as determined by the shaft encoder; recording by the controlling computer rotational position Y at which the timing shaft or other suitable rotating member actually stops, as determined by the shaft encoder; calculating by the controlling computer from the rotational positions X, Y, and Z with the equation X–(Y–Z)=N a rotational position N where the next stop command is issued by the controlling computer; issuing by the controlling computer the next stop command at the rotational position N; noting by the controlling computer a rotational position F where the timing shaft or other suitable rotating member actually stops after the issuing of the next stop command by the controlling computer at the rotational position N; and repeating previous the steps each time the timing shaft or other suitable rotating member is stopped by the controlling computer.

Other objects, advantages, and novel features of the present invention will become apparent from the detailed description that follows, when considered in conjunction with the associated drawings.

BRIEF DESCRIPTION OF THE DRAWINGS

FIG. 4A shows a first cycle of the inserter and FIG. 4B shows the next cycle of the inserter illustrating the altered actual stop rotational position being essentially the same as the strategic stop rotational position.

FIG. 5A shows a first cycle of the inserter and FIG. 5B shows the next cycle of the inserter illustrating the altered actual stop rotational position being essentially the same as the strategic stop rotational position.

DESCRIPTION OF THE PREFERRED EMBODIMENT

Figure 1:
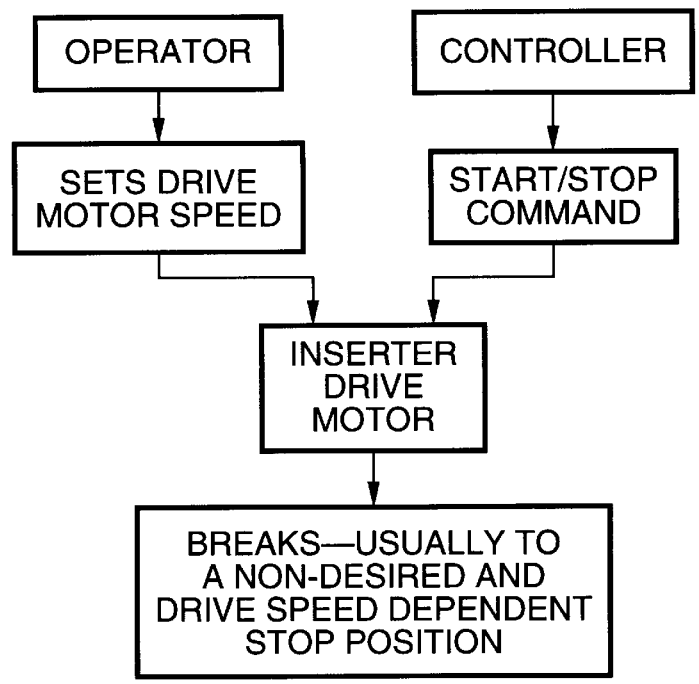
FIG. 1 is a flow diagram of the PRIOR ART for a typical stopping scheme for an inserter.
Figure 2:
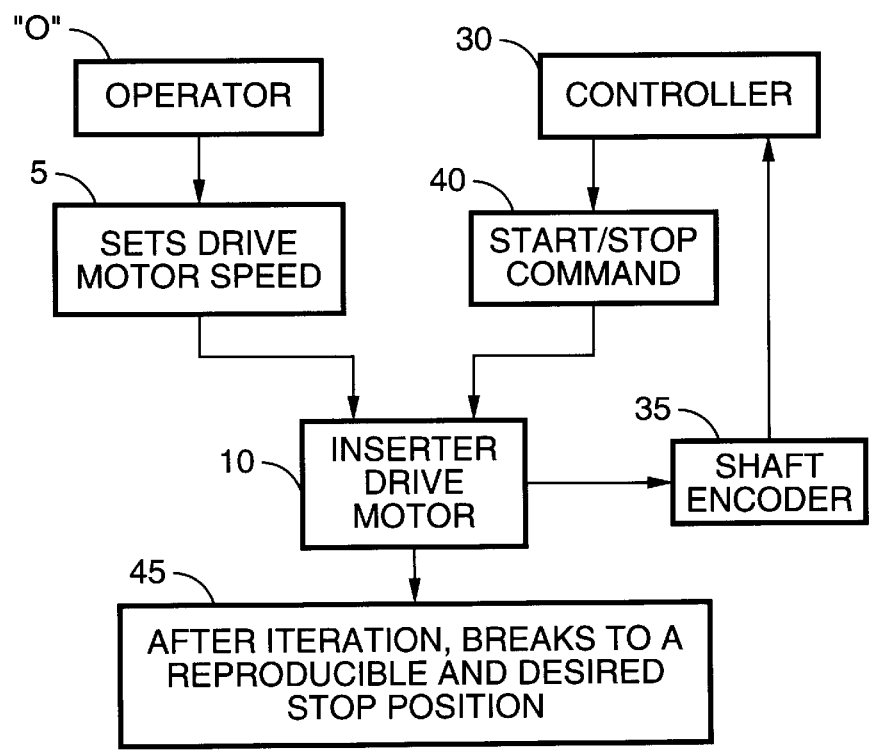
FIG. 2 is a flow diagram for the subject invention stopping scheme for an inserter.

Referring now to FIG. 1 for explanatory prior art and to FIGS. 2–5 for the subject system and method, there is shown in FIGS. 2–5 a preferred embodiment of a system and method for stopping an inserter at a desired or strategic stop rotational position of the timing shaft or other suitable rotating member. The terms "desired" and "strategic" are used to imply positions that are necessary or critical to establish with reasonable certainty in order to synchronize the various operations of the inserter. To better present the benefits and advantages of the subject system over the existing prior art, the mechanics of the prior art for stopping an inserter is discussed immediately below.

As seen in FIG. 1, usually, an operator manually sets the drive speed for the inserter motor. Once the drive speed is set either the operator or a controller (since the controller is missing on older machines, the controller is designated in dashed lines) starts the inserter. To stop the inserter either the operator or the controller initiates a stop command that turns off the positive action of the drive motor and brakes the inserter to a stop. Clearly, the actual stop position is at least a function of the selected speed for the inserter and exactly when the stop command is issued. As indicated above, it is often critical to have a reproducible and desired or strategic stop position to avoid or prevent various problems at different stages in the inserter cycle of processing a mailing piece.

In contrast to the traditional start/stop cycle for the inserter noted above, the subject device yields a reproducible, desired or strategic, and non-speed related stopping position for timing shaft or other suitable rotating member and thus the inserter. In the subject invention, an operator O usually has the option of setting the speed 5 of the inserter drive motor 10, but the controller 30 may optionally set the inserter's speed.

The controller 30 of the subject invention is generally a computer having suitable standard interfacing between the various components of the subject invention. Usually the controller is a PC (personal computer) or its equivalent and is often interfaced to a central computer having data base files containing information indicating the items within a mailing piece. Although the controller 30 is usually a PC the functions may be found in equivalent hardwired devices and the like.

Although for the traditional stopping scheme noted in FIG. 1 a shaft encoder linked to the timing shaft or other suitable rotating member is sometimes present, for the subject invention a shaft encoder 35 or its equivalent is required to fix precisely the rotational position of the inserter timing shaft or other suitable rotating member and thus the exact inserter position in a mailing cycle for filling an envelope. Generally, the shaft encoder 35 reflects the angular position of the timing shaft or other suitable rotating member in degrees from 0° to 360° or the equivalent from a fixed reference or zero point. In turn, the rotational position of the timing shaft or other suitable rotating member reflects exactly where a mailing piece is in the envelope filling process (i.e., just started, at the insert insertion stage, at the flap wetting stage, at the flap sealing stage, and the like). Thus, when the timing shaft or other suitable rotating member stops at a particular rotational position the entire inserter stops at whatever stage it is at, at that point in time.

Once the inserter speed is chosen 5, the controller 30 issues a start command 40 to start or ramp-up the drive motor to rotate the inserter timing shaft or other suitable rotating member. (Optionally, the operator O may "bump" (quick on and off)) the inserter to start and stop a cycle, but this is usually only used to correct an error that has occurred or to test a particular function of the apparatus.) As the motor turns the timing shaft or other suitable rotating member, the linked shaft encoder 35 communicates exact the rotational position of the shaft to the controller 30.

Figure 3:
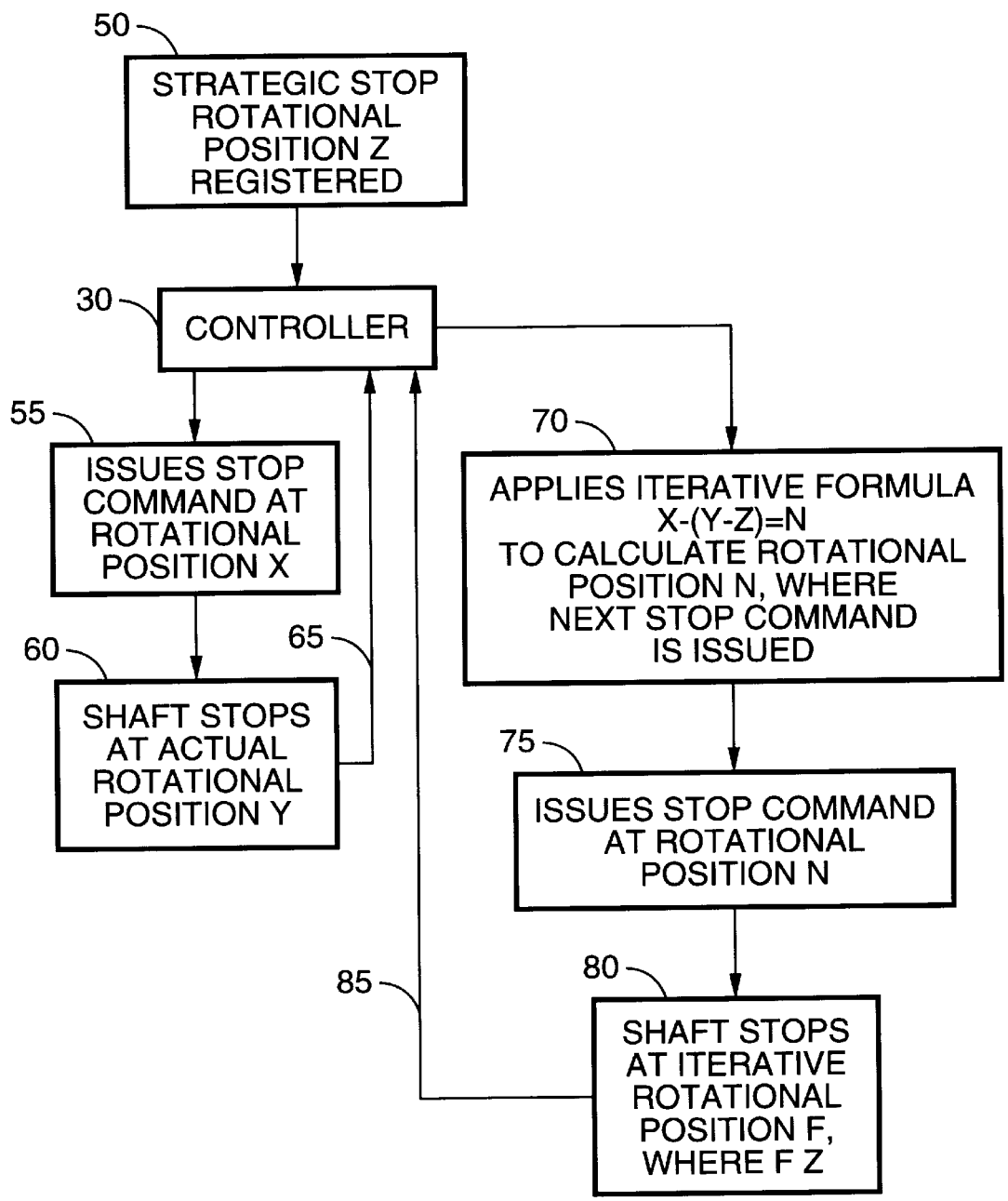
FIG. 3 is a flow diagram indicating the decisional steps taken by the subject controller in the subject iterative process that produces an actual stop rotational position that matches the desired or strategic stop rotational position.

In a feedback or iterative process 45 detailed in FIGS. 3–5 the controller utilizes the rotational positions communicated by the shaft encoder to establish critical events needed to halt the inserter at a desired or strategic rotational position. Specifically as seen in FIG. 3, a strategic stop rotational position Z is registered 50 with the controller 30. In other words, usually the rotational position where the stop should occur is stored in the controller's memory or, in more unusual conditions, fed in on a per mailing job basis.

The controller 30, having been provided with the strategic stop rotational position Z of the timing shaft or other suitable rotating member, issues to the inserter (usually the motor) a stop command at rotational position X 55. Once the stop command is issued 55 the motor either brakes via standard means or coasts to stop the timing shaft or other suitable rotating member at an actual rotational position Y, which most likely, due to the probability of stopping anywhere within the 0° to 360° range, varies from the strategic rotational position Z. Since, as noted above, stopping at a rotational position other than the strategic Z position may cause problems for the mailing cycle, a feedback or iterative correction process is initiated.

The actual rotational position Y at which the timing shaft or other suitable rotating member is found to stop is communicated 65 to the controller 30 via suitable interfacing. The controller 30 then applies an iterative process 70 in which a formula is used to establish where the next stop command should be issued 75 to produce an actual stop rotational position at the strategic stop rotational position Z. The formula is $X-(Y-Z)=N$, wherein N is the rotational position where the next stop command needs to be issued 75 by the controller to stop the timing shaft or other suitable rotating member at an iterative rotational stop position F which is at, very near, or approximately the strategic rotational position Z 80. To insure that the strategic rotational position Z is approached each time the inserter is stopped, this iterative process is repeated 85 for each stopping of the timing shaft or other suitable rotating member.

Figure 4A:
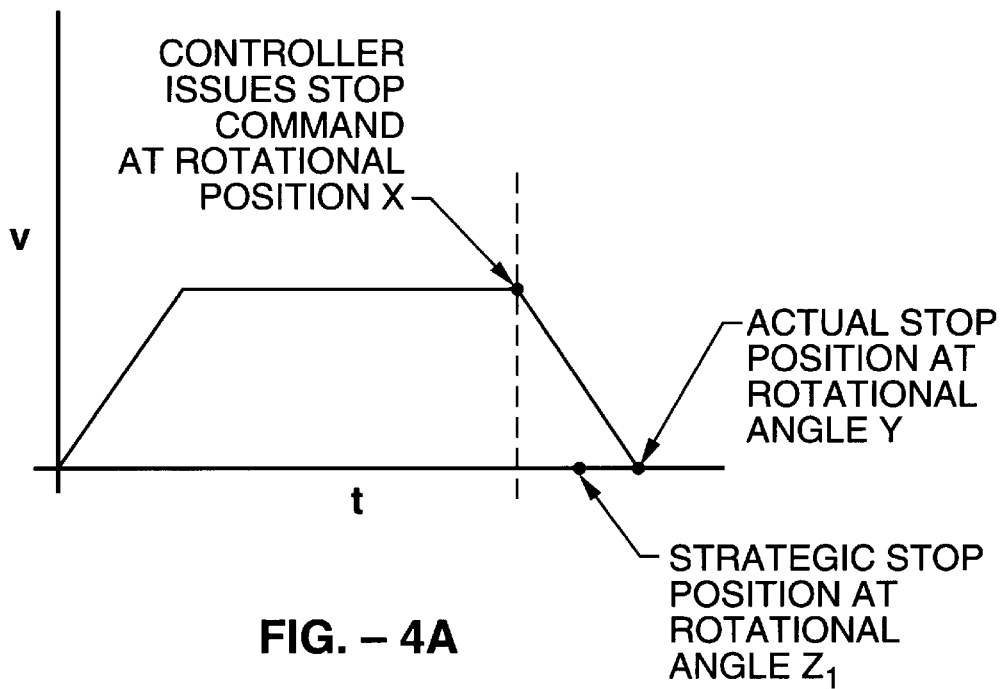
FIGS. 4A–4B are graphs showing how the subject invention compensates for an actual stop rotational position being past a desired or strategic stop rotational position, thereby producing correspondence between the desired or strategic and actual stop rotational positions.
Figure 4B:
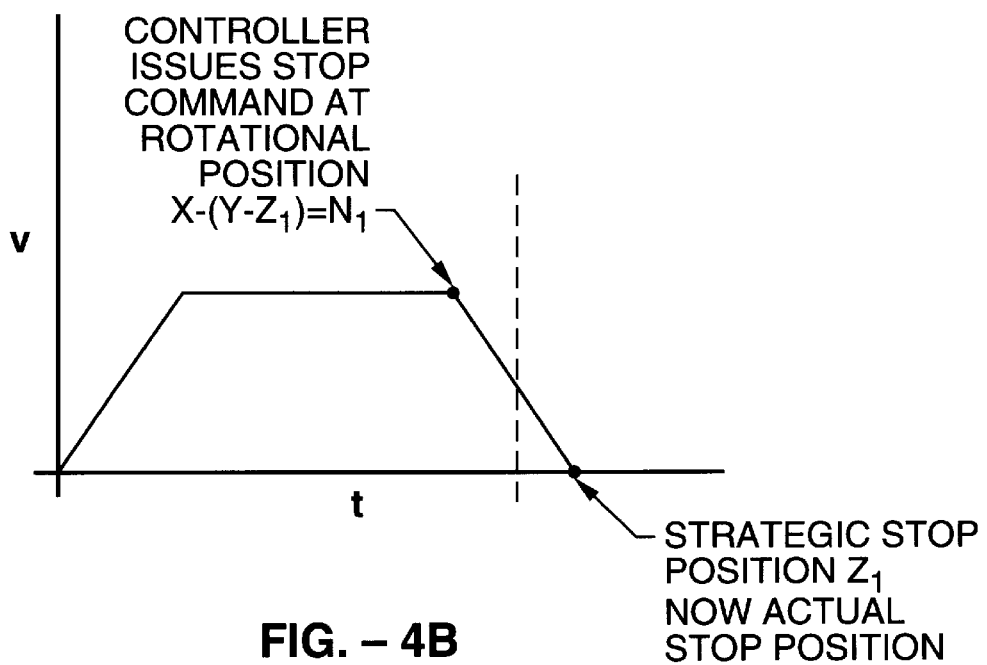

To further clarify the subject system and process, FIGS. 4 and 5 are presented. These figures present graphically the process of starting and stopping an inserter motor. Plotted in all of the graphs are rotational velocity V versus time t required to ramp-up the inserter motor and associated timing shaft or other suitable rotating member and to brake or ramp-down the inserter and associated timing shaft or other suitable rotating member to a stop. FIG. 4A shows the timing shaft or other suitable rotating member ramping-up to a particular rotational velocity that remains relatively constant until the controller issues a stop command at rotational position X. The rotational velocity ramps-down until the timing shaft or other suitable rotating member actually stops at rotational angle or position Y. For exemplary purposes, the desired or strategic stop rotational position should have been at rotational position $Z_1$ which is before the actual stopping position Y. The controller is supplied with the X, Y, and $Z_1$ rotational positions and applies the general formula stated above to iteratively alter the rotational position at which it issues the next stop command (as shown in FIG. 4B for the next cycle of the inserter) to rotational position $N_1$, where $X-(Y-Z_1)=N_1$. The issuance of the stop command at N1 results is the timing shaft or other suitable rotating member stopping at an actual stop rotational position that is the same or approximately the same as the strategic stop rotational position $Z_1$.

Figure 5A:
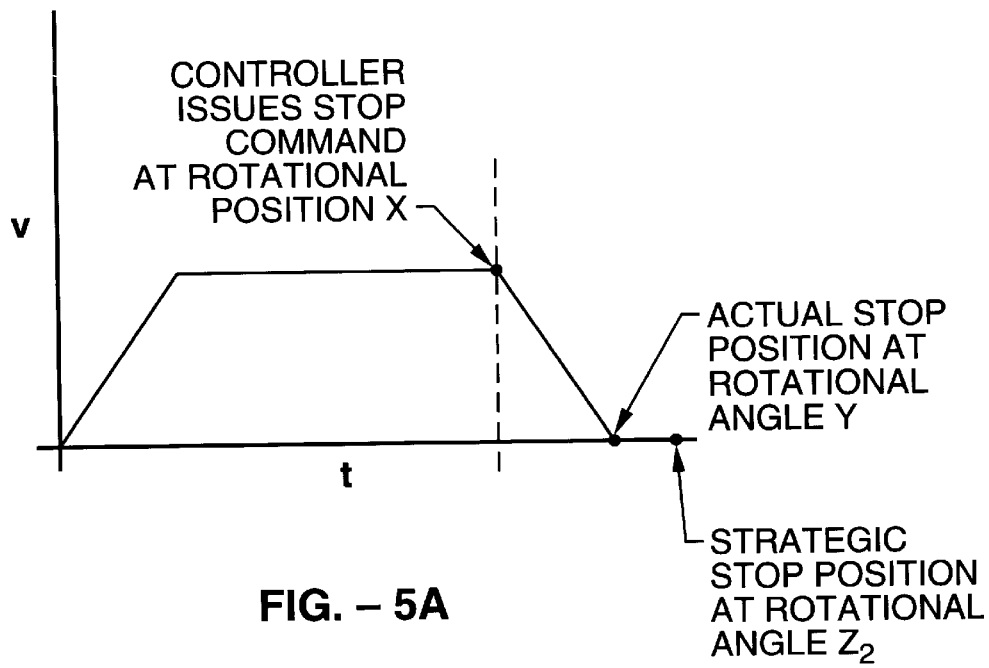
FIGS. 5A–5B are graphs showing how the subject invention compensates for an actual stop rotational position being before a desired or strategic stop rotational position, thereby producing correspondence between the desired or strategic and actual stop rotational positions.
Figure 5B:
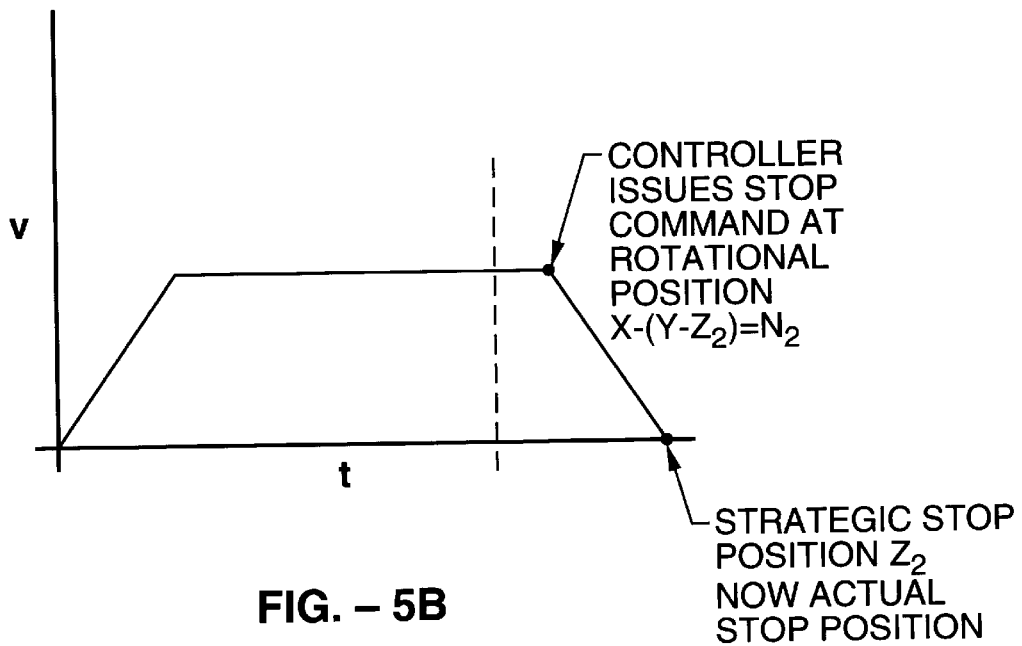

FIGS. 5A and 5B illustrate that the generalized equation $X-(Y-Z)=N$ works equally as well with a strategic stop rotational position $Z_2$ that is after the actual rotational stop position Y. Using $X-(Y-Z_2)=N_2$ to determine that the controller issues the next stop command at $N_2$, the resulting actual stop rotational position is the same or approximately the same as the strategic stop rotational position $Z_2$.

Therefore, one embodiment of the subject invention is a system that comprises a shaft encoder linked to the timing shaft or other suitable rotating member for establishing rotational positions of the timing shaft or other suitable rotating member and a controller having programming in a suitable language that utilizes the established rotational positions of the timing shaft or other suitable rotating member for stopping the timing shaft or other suitable rotating member at the strategic rotational position. The controller's programming comprises the steps of registering a strategic stop rotational position Z for the timing shaft or other suitable rotating member; issuing a stop command to the motor when the coupled timing shaft or other suitable rotating member is at a rotational position X, as determined by the shaft encoder; recording a rotational position Y at which the timing shaft or other suitable rotating member actually stops, as determined by the shaft encoder; calculating from the rotational positions X, Y, and Z a rotational position N with the equation $X-(Y-Z)=N$, wherein N is a rotational position at which the next stop command is issued by the programming; issuing the next stop command at the rotational position N; noting a rotational position F where the timing shaft or other suitable rotating member actually stops after the issuing of the next stop command at the rotational position N; and repeating the programming steps each time the timing shaft or other suitable rotating member is stopped.

Specifically, another embodiment of the subject invention is a method that comprises the steps of: utilizing a shaft encoder linked to the timing shaft or other suitable rotating member for establishing rotational positions of the timing shaft or other suitable rotating member; registering by the controlling computer a strategic stop rotational position Z for the timing shaft or other suitable rotating member; issuing by the controlling computer a stop command to the motor when the coupled timing shaft or other suitable rotating member is at a rotational position X, as determined by the shaft encoder; recording by the controlling computer rotational position Y at which the timing shaft or other suitable rotating member actually stops, as determined by the shaft encoder; calculating by the controlling computer from the rotational positions X, Y, and Z with the equation $X-(Y-Z)=N$ a rotational position N where the next stop command is issued by the controlling computer; issuing by the controlling computer the next stop command at the rotational position N; noting by the controlling computer a rotational position F where the timing shaft or other suitable rotating member actually stops after the issuing of the next stop command by the controlling computer at the rotational position N; and repeating previous the steps each time the timing shaft or other suitable rotating member is stopped by the controlling computer.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. For use with an envelope inserting apparatus having a rotating member, a system for producing an actual stop rotational position for the rotating member that corresponds to a strategic stop rotational position for the rotating member; comprising:
   a) means for establishing a rotational position of the rotating member and
   b) means responsive to said establishing means for initiating the stopping of the rotating member at the strategic rotational position, wherein said stopping initiation means comprises a controller that determines from a previous stop of the shaft when a stop command is issued for stopping the shaft at said strategic stop rotational position.

2. For use with an envelope inserting apparatus having a motor coupled to a rotating member, a system for producing an actual stop position for the rotating member that corresponds to a strategic stop rotational position for the rotating member; comprising:
   a) means for establishing a rotational position of the rotating member and
   b) a controller interfaced with said rotational position establishing means and having programming that utilizes said established rotational position of the rotating member for initiating stopping of the rotating member at the strategic rotational position, wherein said controller's programming comprises the steps of:
      i) registering a strategic stop rotational position Z for the rotating member;
      ii) issuing a stop command to the motor when the coupled rotating member is at a rotational position X, as determined by said rotational position establishing means;
      iii) recording a rotational position Y at which the rotating member actually stops, as determined by said rotational position establishing means;
      iv) calculating from said rotational positions X, Y, and Z a rotational position N where the next stop command is issued by said programming; and
      v) issuing said next stop command at said rotational position N.

3. An inserter stopping system according to claim 2, wherein said programming further comprises the step of registering a rotational position F where the rotating member actually stops after said issuing of said next stop command at said rotational position N.

4. An inserter stopping system according to claim 3, wherein said programming further comprises the step of repeating said programming steps each time the rotating member is stopped.

5. For use with an envelope inserting apparatus having a motor coupled to a rotating member, a system for producing an actual stop position for the rotating member that corresponds to a strategic stop rotational position for the rotating member; comprising:
   a) a shaft encoder linked to the rotating member for establishing rotational positions of the rotating member and
   b) a controller having programming that utilizes said established rotational positions of the rotating member for stopping the rotating member at the strategic rotational position, wherein said controller's programming comprises the steps of:
      i) registering a strategic stop rotational position Z for the rotating member;
      ii) issuing a stop command to the motor when the coupled rotating member is at a rotational position X, as determined by said shaft encoder;
      iii) recording a rotational position Y at which the rotating member actually stops, as determined by said shaft encoder;
      iv) calculating from said rotational positions X, Y, and Z a rotational position N where the next stop command is issued by said programming; and
      v) issuing said next stop command at said rotational position N.

6. An inserter stopping system according to claim 5, wherein said programming further comprises the step of registering a rotational position F where the rotating member actually stops after said issuing of said next stop command at said rotational position N.

7. An inserter stopping system according to claim 6, wherein said programming further comprises the step of repeating said programming steps each time the rotating member is stopped.

8. For use with an envelope inserting apparatus having a motor and coupled rotating member, a system for producing an actual stop position for the rotating member that corresponds to a strategic stop rotational position for the rotating member; comprising:
   a) a shaft encoder linked to the rotating member for establishing rotational positions of the rotating member and
   b) a controller having programming that utilizes said established rotational positions of the rotating member for stopping the rotating member at the strategic rotational position, wherein said controller's programming comprises the steps of:
      i) registering a strategic stop rotational position Z for the rotating member;
      ii) issuing a stop command to the motor when the coupled rotating member is at a rotational position X, as determined by said shaft encoder;
      iii) recording a rotational position Y at which the rotating member actually stops, as determined by said shaft encoder;
      iv) calculating from said rotational positions X, Y, and Z a rotational position N where the next stop command is issued by said programming;
      v) issuing said next stop command at said rotational position N; and
      vi) noting a rotational position F where the rotating member actually stops after said issuing of said next stop command at said rotational position N.

9. An inserter stopping system according to claim 8, wherein said programming further comprises the step of repeating said programming steps each time the rotating member is stopped.

10. An inserter stopping system according to claim 8, wherein said rotational position N is calculated using the equation $X-(Y-Z)=N$.

11. For use with an envelope inserting apparatus having a motor and coupled rotating member, a system for producing an actual stop position for the rotating member that corresponds to a strategic stop rotational position for the rotating member; comprising:
   a) a shaft encoder linked to the rotating member for establishing rotational positions of the rotating member and b) a controller having programming that utilizes said established rotational positions of the rotating member for stopping the rotating member at the strategic rotational position, wherein said controller's programming comprises the steps of:

i) registering a strategic stop rotational position Z for the rotating member;

ii) issuing a stop command to the motor when the coupled rotating member is at a rotational position X, as determined by said shaft encoder;

iii) recording a rotational position Y at which the rotating member actually stops, as determined by said shaft encoder;

iv) calculating from said rotational positions X, Y, and Z a rotational position N with the equation X−(Y−Z)=N, wherein N is a rotational position at which the next stop command is issued by said programming;

v) issuing said next stop command at said rotational position N;

vi) noting a rotational position F where the rotating member actually stops after said issuing of said next stop command at said rotational position N; and vii) repeating said programming steps each time the rotating member is stopped.

12. For use with an envelope inserting apparatus having a motor coupled to a rotating member and a controller, a method for stopping the rotating member at a strategic stop rotational position, comprising the steps of:

a) utilizing means for establishing rotational positions of the rotating member;

b) registering a strategic stop rotational position Z for the rotating member;

c) issuing a stop command to the motor when the coupled rotating member is at a rotational position X, as determined by said rotational position establishing means;

d) recording a rotational position Y at which the rotating member actually stops, as determined by said rotational position establishing means;

e) calculating from said rotational positions X, Y, and Z a rotational position N where the next stop command is issued by said programming; and f) issuing said next stop command at said rotational position N.

13. An inserter stopping method according to claim 12, further comprising the step of registering a rotational position F where the rotating member actually stops after said issuing of said next stop command at said rotational position N.

14. For use with an envelope inserting apparatus having a motor coupled to a rotating member and a controlling computer, a method for stopping the rotating member at a strategic stop rotational position, comprising the steps of:

a) utilizing a shaft encoder linked to the rotating member for establishing rotational positions of the rotating member;

b) registering by the controlling computer a strategic stop rotational position Z for the rotating member;

c) issuing by the controlling computer a stop command to the motor when the coupled rotating member is at a rotational position X, as determined by said shaft encoder;

d) recording by the controlling computer a rotational position Y at which the rotating member actually stops, as determined by said shaft encoder;

e) calculating by the controlling computer from said rotational positions X, Y, and Z a rotational position N where the next stop command is issued by said controlling computer; and f) issuing by the controlling computer said next stop command at said rotational position N.

15. An inserter stopping method according to claim 14, further comprising the step of registering by the controlling computer a rotational position F where the rotating member actually stops after said issuing of said next stop command by the controlling computer at said rotational position N.

16. For use with an envelope inserting apparatus having a motor coupled to a rotating member, a method for stopping the rotating member at a strategic stop rotational position, comprising the steps of:

a) utilizing a shaft encoder linked to the rotating member for establishing rotational positions of the rotating member;

b) registering by the controlling computer the strategic stop rotational position Z for the rotating member;

c) issuing by the controlling computer a stop command to the motor when the coupled rotating member is at a rotational position X, as determined by said shaft encoder;

d) recording by the controlling computer rotational position Y at which the rotating member actually stops, as determined by said shaft encoder;

e) calculating by the controlling computer from said rotational positions X, Y, and Z a rotational position N where the next stop command is issued by the controlling computer;

f) issuing by the controlling computer said next stop command at said rotational position N;

g) noting by the controlling computer a rotational position F where the rotating member actually stops after said issuing of said next stop command by the controlling computer at said rotational position N; and h) repeating previous said steps each time the rotating member is stopped by the controlling computer.

17. An inserter stopping method according to claim 16, wherein said rotational position N is calculated using the equation X−(Y−Z)=N.

18. For use with an envelope inserting apparatus having a motor coupled to a rotating member and a controlling computer, a method for stopping the rotating member at a strategic rotational position, comprising the steps of:

a) utilizing a shaft encoder linked to the rotating member for establishing rotational positions of the rotating member;

b) registering by the controlling computer a strategic stop rotational position Z for the rotating member;

c) issuing by the controlling computer a stop command to the motor when the coupled rotating member is at a rotational position X, as determined by said shaft encoder;

d) recording by the controlling computer rotational position Y at which the rotating member actually stops, as determined by said shaft encoder;

e) calculating by the controlling computer from said rotational positions X, Y, and Z with the equation X−(Y−Z)=N a rotational position N where the next stop command is issued by the controlling computer;

f) issuing by the controlling computer said next stop command at said rotational position N;

g) noting by the controlling computer a rotational position F where the rotating member actually stops after said issuing of said next stop command by the controlling computer at said rotational position N; and h) repeating previous said steps each time the rotating member is stopped by the controlling computer.

* * * * *